Figure 1:
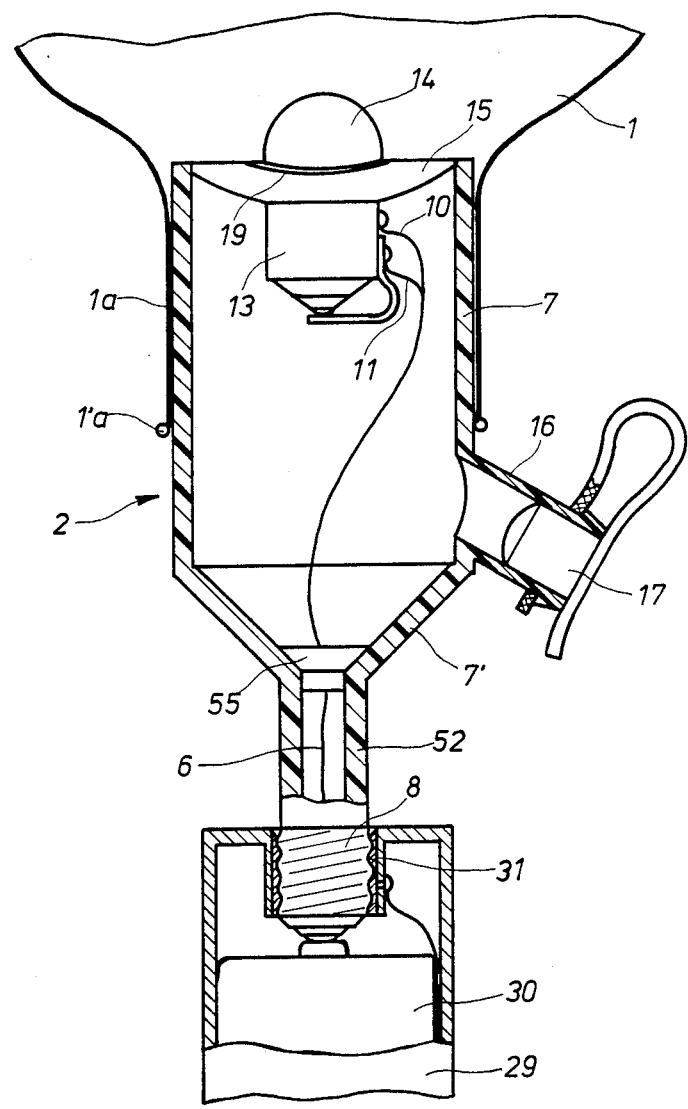

United States Patent [19]

Neumeier

[11] Patent Number: 4,794,498
[45] Date of Patent: Dec. 27, 1988

[54] ACCESSORY DEVICE FOR AN INFLATABLE GAS BALLOON

[76] Inventor: Robert Neumeier, D-8183 Rottach-Egern, Weissachaustr.21, Fed. Rep. of Germany

[21] Appl. No.: 161,998

[22] Filed: Mar. 2, 1988

[30] Foreign Application Priority Data

| Oct. 29, 1984 | [DE] | Fed. Rep. of Germany | 3439524 |
| Dec. 7, 1984 | [DE] | Fed. Rep. of Germany | 3444674 |
| Dec. 12, 1984 | [DE] | Fed. Rep. of Germany | 84115308 |
| Feb. 6, 1985 | [DE] | Fed. Rep. of Germany | 8503258[U] |
| Feb. 21, 1985 | [DE] | Fed. Rep. of Germany | 8504956[U] |
| Mar. 4, 1985 | [DE] | Fed. Rep. of Germany | 8506181[U] |
| Aug. 2, 1985 | [DE] | Fed. Rep. of Germany | 8522395[U] |
| Aug. 2, 1985 | [DE] | Fed. Rep. of Germany | 8522394[U] |
| Sep. 20, 1985 | [DE] | Fed. Rep. of Germany | 8526946[U] |

[51] Int. Cl.$^4$ .................................. F21P 1/02
[52] U.S. Cl. .................................. 362/186; 362/362
[58] Field of Search ............... 362/186, 362, 812, 806, 362/363, 252

[56] References Cited

U.S. PATENT DOCUMENTS

| 1,832,408 | 11/1931 | Modes | 362/362 |
| 1,858,991 | 5/1932 | Frost | 362/362 |
| 2,078,707 | 4/1937 | Braunschweig | 362/362 |
| 2,381,520 | 8/1945 | Saunders | 362/186 |
| 2,383,390 | 8/1945 | Jacobs | 362/186 |
| 2,542,361 | 2/1951 | Roxburgh | 362/362 |
| 3,258,589 | 6/1986 | Doring | 362/186 |
| 3,536,906 | 10/1970 | Bloom | 362/362 |
| 3,836,761 | 9/1974 | Klienman et al. | 362/362 |
| 4,027,150 | 5/1977 | Dean | 362/186 |
| 4,303,970 | 12/1981 | Robertson | 362/186 |
| 4,535,392 | 8/1985 | Montgomery | 362/186 |
| 4,542,445 | 9/1985 | Maslatta | 362/363 |
| 4,591,959 | 5/1986 | Kanyon | 362/252 |

Primary Examiner—Raymond A. Nelli
Attorney, Agent, or Firm—Price, Gess & Ubell

[57] ABSTRACT

Acessory device for an inflatable gas ballon (1) having, for inflation of the balloon (1) an elastically expansible tube-shaped balloon neck (1a), with a sealing head (2) for the balloon neck (1a) and an electric lamp (14) for internal illumination of the balloon (1). According to the invention, the sealing head (2) is constructed as a cup-shaped housing (7) having an open end and an end closed by a bottom (7'), the open end being adapted to be inserted in sealing-tight fashion into and elastically expanding the balloon neck (1a). Disposed in the open end of the housing (7) is a light reflector (15) which surrounds the electric bulb (14) which is electrically connected to an electro-mechanical coupling in the form of a screw-type bulb cap (8) which is provided for simultaneous establishment of an electrical connection of the lamp (14) to an external power source and for mechanical supporting of the sealing head (2).

12 Claims, 5 Drawing Sheets

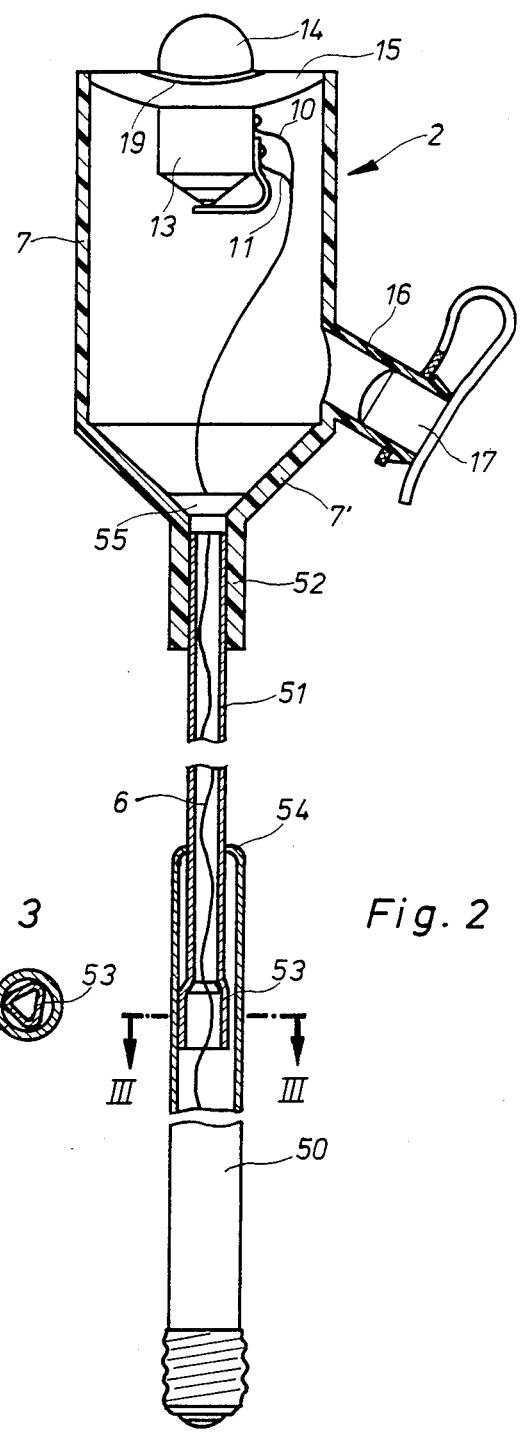

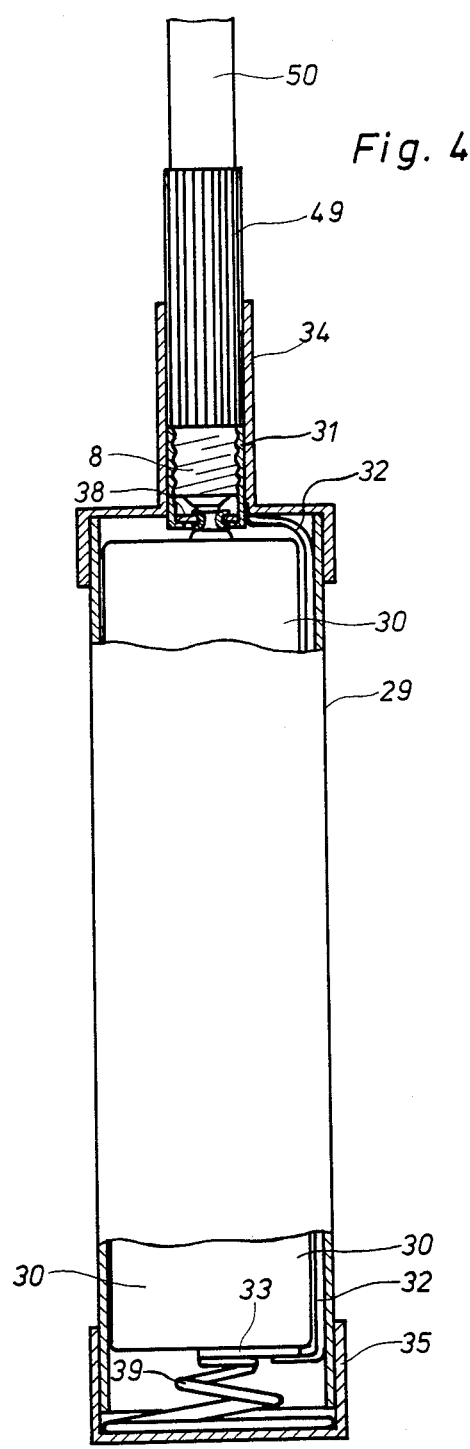
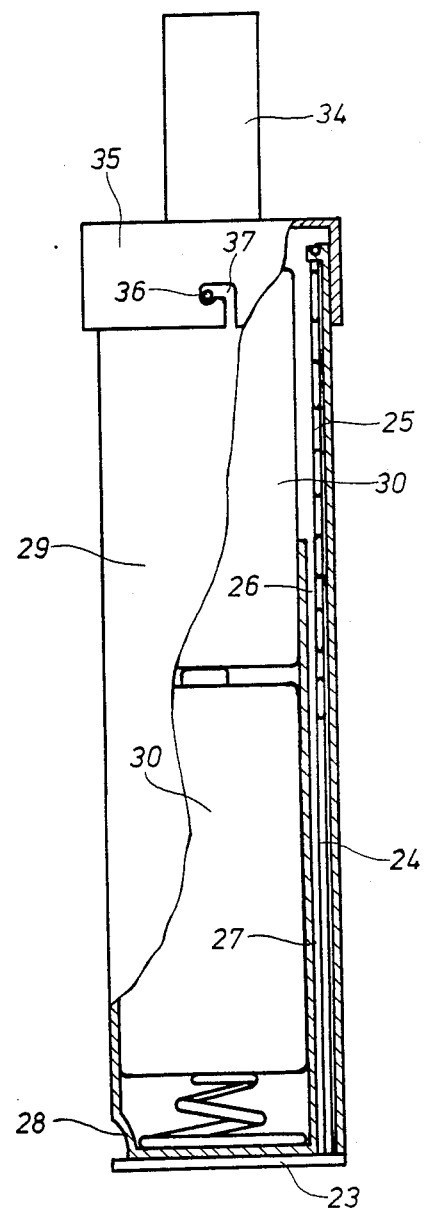
Fig. 4
Fig. 5

ACCESSORY DEVICE FOR AN INFLATABLE GAS BALLOON

This is a continuation of application Ser. No. 882,889, filed June 24, 1986.

The invention relates to an accessory device for an inflatable gas balloon having, for inflation of the balloon, an elasticaly expansible tube- shaped balloon neck, with a head for sealing the neck of the inflated balloon and with an electric lamp for internal illumination of the balloon.

The invention can be used for commercially available translucent gas balloons such as toy balloons, balloons for advertising purposes and for decoration and the like.

A prior art accessory device for sealing the filling end of an inflated air balloon and for its internal illumination (DE-A No. 30 15 962) has a sealing head which is intended to be inserted in sealing-tight manner into the neck of an air balloon, after which the air balloon is inflated through the sealing head. For inner illumination of the balloon there is constructed on the sealing head and carrying the lamp a rod-shaped lamp carrier which penetrates substantially into and as far as the centre of the inflated air balloon. Therefore, the length of the lamp carrier must be greater than the length of the not yet inflated balloon-envelope, so that the pulling of the neck of the balloon-envelope onto the sealing head in sealing-tight fashion becomes complicated. Namely, the tip of the balloon-envelope encounters the lamp carrier which is inserted into the balloon before the neck of the balloon has been pulled into its final position on the sealing head, so that during further pulling-on, the balloon-envelope has to be stretched and therefore the stretching forces counteract the pulling of the balloon further onto the device. Furthermore, there is a danger that the thin rubber balloon-envelope will be punctured by the lamp carrier. Furthermore, the cost of producing the prior art accessory device is all-in-all relatively high.

By virtue of the invention, it is possible to provide an accessory device for gas balloons for the interior illumination thereof, which is of simple design so that the accessory device can be manufactured and used as a mass-produced article. Furthermore, it is intended that the sealing head of the accessory device be capable of being inserted easily and effortlessly into the neck of the balloon.

According to the invention, the sealing head for the balloon neck of the balloon is constructed as a cup-shaped housing, the open end of which is inserted first into the balloon in sealing-tight fashion, accompanied by an elastic widening-out of the balloon-neck. Disposed in the open end of the housing is a light reflector which encloses the electric light bulb, which is connected via electrical conductors having an external electromechanical coupling for simultaneous supporting of the sealing head and electrical connection of the bulb to a source of electric current.

By reason of the cup-shape of the sealing head according to the invention, this latter is of material-saving construction and it is possible to utilise the interior of the sealing head to accomodate the components for supporting the lamp in the open end of the sealing head, the connecting conductors being led out through the bottom of the cup in gas-tight but relatively simple fashion. The light reflector around the bulb achieves satisfactory illumination of the interior of the balloon although the bulb is not disposed in the middle of the balloon but at the balloon end of the neck.

The peripheral surface of the sealing head is substantially cylindrical, preferably circularly cylindrical; it can however also be somewhat conical. The diameter of the sealing head is greater than that of the balloon neck when the balloon-envelope is not inflated and is sufficiently great that the balloon neck is in an elastically widened-out condition when it is on the peripheral face of the sealing head, and is therefore a close fit on the sealing head to ensure an elastically gas-tight seating. Preferably, the outside diameter of the sealing head is aproximately twice as great as the diameter of the neck of the non-inflated balloon-envelope. The sealing head is relatively short. The length of its cup shell need not be as much as or need only be slightly longer than the elastically widened-out neck of the balloon-envelope. Insertion of the sealing head into the balloon neck can take place simply in that firstly the balloon neck is rolled up into a ring which is then stretched open and pulled onto the open end of the sealing head, after which the ring is unrolled along the outer surface of the sealing head.

Since furthermore according to the invention there is an electromechanical coupling at the end of the conductor connections leading to the bulb in the sealing head, one and the same operation can establish the mechanical fixture of the sealing head on a support and establish the electrical connection betrween an external current source and the bulb. The electromechanical coupling may be constructed as a plug-in coupling but it is preferably a rotary coupling such as a bayonet coupling or in particular a screw-in coupling.

In the particularly preferred embodiment, the electromechanical coupling is a screw-type bulb cap of the size of the screw caps of commercially available incandescent lamps. Thus, connection of the bulb into the sealing head can take place at any appropriate current source which has a screw-type socket as a counterpart to the screw-type bulb cap. At the same time, no electric switch is necessary to make or break the supply of current to the bulb because it is necessary only to turn the screw-type bulb cap sufficiently to establish electric contact between the central pole of the screw-type bulb cap and that of the screw-type lamp socket, without thereby separating the mechanical coupling of the sealing head and thus of the balloon from the holding means.

The principle underlying the solution according to the invention is appropriate for all purposes in which gas balloons with an interior illumination are desired. For example, the accessory device according to the invention may be constructed for the illumination of children's air balloons and may have a grip housing containing an electric battery and a lamp socket for the screw-type bulb cap, to which the sealing head is connected by a cable or a supporting tube. The bulb can also be constructed to be operated from the mains supply and the size of the screw-type bulb cap may be such that it fits into a conventional lamp socket intended for incandescent lamps designed to be operated from the mains supply. In this case, the sealing head can be screwed directly into a lamp socket of a chain of lamps such as are used for example for decorative purposes in hostelries or for lighting up a Christmas tree, so that the chain of lamps becomes a chain of illuminated air balloons, the lamps in which are fed from the mains.

Figure 6:
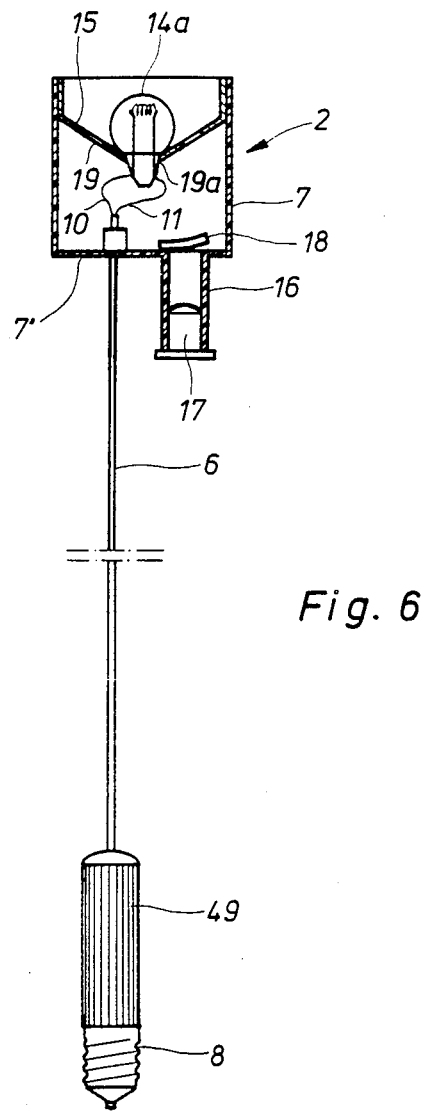
Figure 8:
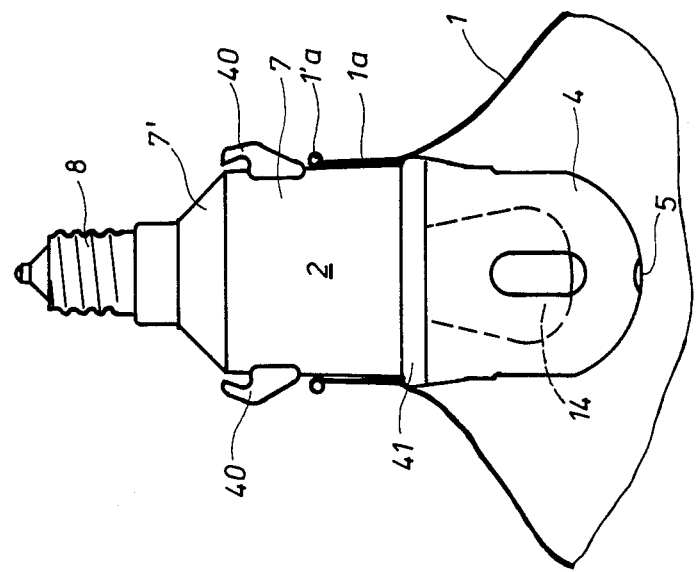
Figure 7:
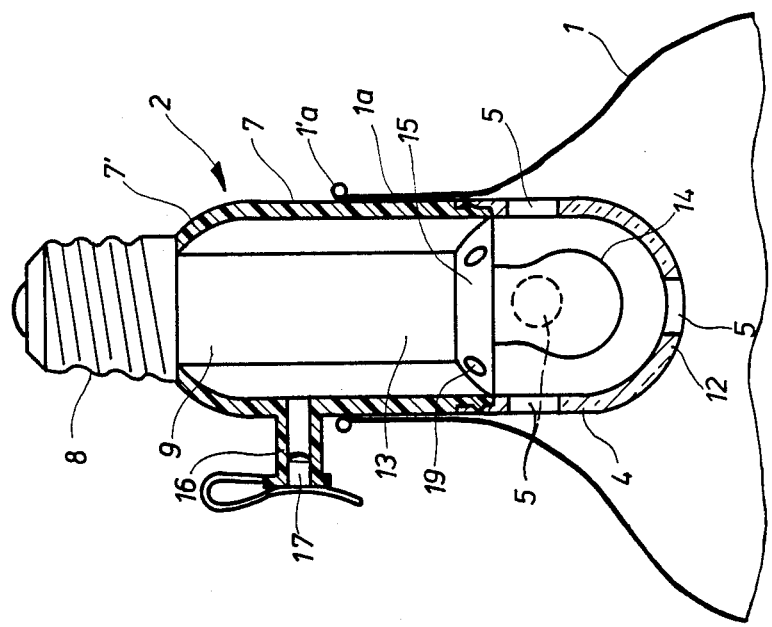

The invention will be described with reference to preferred embodiments shown in the accompanying drawings, in which:

FIGS. 1 to 6 show accessory devices according to the invention for inflatable gas balloons with a lamp fed by an electric battery in a grip housing, and FIGS. 7 and 8 show two embodiments designed for the lamp to be operated from the electricity supply mains.

The sealing heads 2 of the embodiments shown in FIGS. 1 and 2 are substantially identical. In each case, they have a hollow cylindrical cup-shaped housing 7 injection moulded from synthetic plastics material and the bottom 7' of which tapers in conical fashion, ending in a downwardly projecting tube 52. In the open end of the housing 7 remote from the tube 52 is disposed a lamp socket 30 into which it is possible to screw a pocket torch lamp 14 and, surrounding this, a concave light reflector 15, which occupies substantially completely the inside cross-section of the open end of the housing 7, its concave reflector surface being disposed at its outside with respect to the housing. For the supply of current to the lamp electrical conductors 10, 11 are connected to the socket 13 and, run together as a cable 6, they are fed through a sealing plug 55 or the like which projects into the top end of the tube 52 which they enter in sealing-tight fashion. The sealing head firstly has the open end of its housing 7 inserted into the balloon-neck 1a and the beaded edge 1'a provided thereon rest in sealing-tight manner on the outer peripheral surface of the housing 7, the open end of the housing 7 together with the lamp 14 and the reflector 15 being disposed at the balloon end of the neck 1a. The result is an effective interior illumination of the air balloon 1 when the lamp 14 is switched on.

The reflector 15 which may at the same time serve as a support for the lamp socket 13 by being rigidly connected to the latter, can be glued, clamped or preferably engaged in click-stop fashion into the open end of the housing 7. It may consist of a metal sheet or synthetic plastics material mirrored on the reflector face or may consist of an ultra-white injection moulding made from a thermoplastics material, particularly a polyester material, having a high proportion of white pigment. Preferably, the injection moulding consists of a thermoplastic polyester material based on polybutylene terephthalate. In consequence, by reason of the relatively high content of white pigment, a very good reflective capacity is achieved with a high light density even with minimal wall thicknesses, the reflective surface being brought to a high degree of brilliance by reason of the surface fineness of the injection mould.

Integrally moulded on the closed end of the housing 7, at the transition between the housing shell and the housing bottom 7' there is a filler connector 16 which can be closed by means of a plug 17 and which serves to inflate the air balloon after the latter has been pulled onto the housing 7. The reflector 15 has at least one air through passage 19, e.g. in the form of a marginal recess, so that a gas supply duct fitting the reflector and serving for inflation of the balloon 1 is constituted by the filler 16, the inerior of the housing 7 and the air aperture 19. In addition to or as an alterantive to the sealing plug 17, it is possible to provide on the filler 16 a non-return valve which exercises a closing function in the direction of its free end. The filler 16 may be aligned at a right-angle to the axis of the housing 7 but is preferably, as shown in the drawing, orientated obliquely downwardly in relation to the axis of the housing. In consequence, inflation of the air balloon 1, the neck 1a of which is pulled onto the housing and which is only at a small distance from the filler 16, is favoured.

The outside diameter of the shell of the housing 7 in the embodiments shown in FIGS. 1 and 2 is approximately twice as great as the inside diameter of the balloon neck 1a before this latter is pulled onto the sealing head 2. The balloon neck 1a can be pulled onto the sealing head 2 in such a way that firstly the balloon neck 1a, starting at the beaded edge 1'a, is rolled up completely into an annular bead which is then stretched over the bulb end of the sealing head 2, undergoing an elastic expansion, after which the bead is unrolled along the outer surface of the housing 7. Then the balloon neck 1a and its beaded edge 1'a bears in an elastically widened-out condition in the manner shown in the drawings with the entire length of the balloon neck 1a resting on the outside face of the housing 7 so that it is tensioned in gastight fashion against the outer surface of the sealing head 2.

In the embodiment shown in FIG. 1, the accessory device for the air balloon 1 also contains a grip housing 29 in which there is an electric battery 30 to serve as a source of current for the bulb 14 of the sealing head 2 and in the top end of which there is a flush-mounted screw-type lamp socket 31. In the case of the embodiment shown in FIG. 1, the conductors 10, 11 are connected to an electromechanical coupling in the form of a conventional screw-type bulb cap 8 which, in the shown embodiment, is a E10-bulb-cap and which is fixed on the bottom end of the connector tube 52 of the sealing head 2 and by which the sealing head 2 can be screwed into the screw-type lamp socket 41 on the grip housing 29 in order simultaneously to establish the electrical connection between the lamp 14 and the battery 30 and the mechanical connection between the sealing head 2 and the grip housing 29. It is possible to provide on the grip housing 29—as conventional for electric pocket torches—a switch (not shown), but preferably such a switch is not provided. Instead, the supply of current from the battery 30 to the lamp 14 is—as explained in greater detail in connection with FIG. 4—established or interrupted in that the screw-type bulb cap 8 is screwed into the lamp socket 31 until its central terminal encounters that of the battery 30 or is unscrewed within the socket 31 until its central terminal becomes detached from that of the battery 30, without thereby completely separating the screwed connection between the sealing head 2 and the grip housing 29.

In the case of the embodiment shown in FIG. 2, on the other hand, there is on the sealing head 2 a support rod 50, 51 which has at its bottom end in the same way a screw-type bulb cap 8 which can be screwed into the socket 31 on the grip housing 29 shown in FIG. 1. The support rod 50, 51 is preferably resiliently flexible so that the air balloon 1 connected to the grip housing 29 can be swung to and fro elastically with the sealing head 2. The support rod 50, 51 is of telescopic construction and consists of an inner telescopic tube 51 which is pushed into the tubular connector 52 of the sealing head 2 and is fixed therein by adhesion, and an outer telescopic tube 50, the outside diameter of which is in accordance with that of the tubular connector 52 and on which the lamp cap 8 is fitted. The cable 6 which is passed out of the sealing head 2 extends helically through the telescopic support rod 50, 51 so that the cable with the telescopic tubes 50, 51 can be opened out and pushed together. However, it is also possible to construct the electrical conductor connection by slip contacts constructed in the telesopic parts or to provide a corresponding storage length for the cable 6 in the outer telescopic tube 50 so that it is capable of following the telescopic extension of the support rod 50, 51. For example, to achieve this, the cable can be wound onto a small spring loaded coil within the support rod so that it is unwound from the coil as the support rod is opened out. It is also possible to us a relatively soft and resilient cable which will coil together inside the telescopic tube as the telescopic rod is collapsed.

In the case of the embodiment shown in FIG. 2, the free end of the outer telescopic tube 50 has an inwardly turned edge 54 which bears in slidingly displaceable fashion on the inner telescopic tube 51 which for its part has at the free end a cross-sectionally triangular widened-out portion 53 which, according to FIG. 3, has its corners bearing in sliding fashion on the inner face of the outer telescopic tube 30. Such a construction achieves at the same time satisfactory guiding of the telescopic tubes within one another without any close adaptation of the tube diameters to one another and the inwards flanging and the widened-out part co-operate as abutments to prevent the telescopic tubes being pulled apart completely. For these purposes, however, it will be evident that other per se known measures are also possible. The support rod 50, 51 may also consist of a single non-telescopic support tube which is preferably likewise resiliently deflectable.

The sealing head 2 shown in FIG. 1 may also be separated from the grip housing 29 in order that together with other equivalent sealing heads 2 it is possible to form a chain of illuminated balloons, e.g. for garden and camping parties or the like. For this purpose, the screw-type lamp caps 8 of the sealing heads 2 are screwed into screw-type lamp sockets distributed along an electric cable such as, for example, is known for lighting of Christmas trees. If plug-in connections are constructed at the ends of the cables, then the chains of illuminated balloons can be extended at will. It is also possible to construct branching chains of lights by likewise disposing a screw-type bulb cap 8 at the end of one of the cables and this can then be screwed into any desired lamp socket of any other cable. Such chains of illuminated air balloons can in particular be connected to a power source such as a car battery, lamps 14 being used which are designed to operate on an electric voltage adapted to the voltage of the power source.

FIGS. 4 and 5 show other embodiments of the grip housing 29. From the top cover of the housing, a central tubular connector 34 projects axially downwardly and serves to accomodate the tubular connector 52 of the sealing head 2 shown in FIG. 1 or the bottom end of the rod 50 shown in FIG. 2, and into the bottom end of which, according to FIG. 4, the screw-type lamp socket 31 is glued or clamped. According to FIG. 4, at the bottom end of the screw-type lamp socket 31 is a flanged-in contact plate 38 which has a central contact to pass current from the central terminal of the battery 30 to the central terminal of the bulb cap 8 which is screwed into the socket 31. This contact plate 38 edged into the socket 31 furthermore co-operates as an abutment with the bulb cap 8 and so forms with the bulb cap an electric switch for switching on and off the lamp 14 in the sealing head 2: By screwing the bulb cap 8 into the socket 31 until the central terminal of the cap 8 encounters the central contact of the contact plate 38, it is possible to connect to the current the lamp 14 in the sealing head 2 and when the cap 8 is unscrewed somewhat within the socket 31, until the central terminal of the cap 8 is lifted away from the central contact of the contact plate 38, the current connection is broken without the mechanical connection of the sealing head 2 to the grip housing 29 being essentially broken. If the central terminal of the lamp cap 8 were in direct contact with the central terminal of the battery 30, then in order to break the power connection, the screw cap would have to be unscrewed by a greater amount than when there is a contact plate 38 in the socket 31, so impairing the mechanical connection between the sealing head and the grip housing 29. In order to achieve a good contact pressure and therefore a good transfer of current, the batteries 30 are namely pressed upwards in the grip housing 29 by a coil spring 39 in conventional manner and if there were no contact plate 38, they would follow the movement of the cap 8 as it is screwed out of the socket 31 by an amount, although this is limited. This is prevented by incorporating the contact plate 38, so that the screw angle when the screw cap 8 is screwed in the socket 31, can be relatively small in order to break the current connection and will not therefore adversely affect the mechanical anchoring of the sealing head 2 on the grip housing 29.

As is also evident from FIG. 4, in the case of the embodiment shown therein, the screw-type bulb cap 8 is extended towards the support rod 50 by a sleeve-like handle 49 on which it is fixed. When the screw cap 8 is screwed completely into the socket 31, the handle 49 projects upwardly out or the tubular connector 34. Its outside diameter corresponds substantially to the inside diameter of the tubular connector so that the support rod 50 is guided in the tubular connector 34 of the grip housing 29 and braced against lateral wobbling. Furthermore, the handle 49 facilitates rotation of the suppport rod 50 to and fro in relation to the grip housing 29 in order to switch the lamp on and off.

The electrical earthing connection of the screw-type socket 31 to the earth terminal at the bottom end of the batteries 30 is established according to FIG. 4 by a multicore flat cable 32 of which the cores exposed at the upper end of the flat cable 32 are clamped between the screw socket 31 and the inside of the tubular connector 34. By using a multi-core flat cable 32 having, for example, two to four cores, a perfect electrical contact with the socket 31 is assured. At the bottom end of the flat cable 32, there is soldered to the exposed cores a contact plate 33 which is pressed by the coil spring 39 firmly against the bottom of the battery cup of the adjadcent battery 30. In order to change the batteries 30, the bottom cap-shaped cover 35 of the grip housing 29 can be separated from the grip housing 29 together with the coil spring 39, whereupon the batteries 30 can be slipped out of the housing. When this happens, the contact plate 33 is swung away laterally downwards from the battery 30 because the flat cable 32 is very flexible. The contact plate 33 then projects downwardly out of the grip housing 29 so that the new batteries 30 can be effortlessly introduced into the housing, after which the contact plate 33 is folded back again against the bottom of the battery cup of the bottom battery 30, where, by fitting the cover 35, it is again firmly clamped by the coil spring 39 between the latter and the battery 30. Connection of the cover 35 to the housing 29 may be made by a screwed joint. Preferably, however, a bayonet connection is envisaged such as is shown in principle in FIG. 5 for the upper cap-shaped closure cover 35 of the grip housing 29. However, in contrast to the view in FIG. 5 which was only selected for purposes of the drawing, it is preferable to construct the angular bayonet slot 37 in the end edge of the casing of the housing 29 while the pin 36 which engages the bayonet slot 37 is preferably formed on the inside of the cap of the cover 35 so that the bayonet connection is concealed from view.

When the illuminated air balloon is intended to be set up for decorative purposes and together with the grip housing 29, on a plate. e.g. a table, then a stand can be provided into which the grip housing 29 can be fitted in tip-proof fashion. However, for non-tipping mounting of the grip housing 29 on a plate, it is preferable to construct at the bottom end of the grip housing 29 a clamping device for clamping the grip housing 29 on a plate: The broad principle of the design of such a clamping device can be seen in FIG. 5. It consists of a preferably annular clamping plate 23 which normally bears on the underside of the grip housing 29 and has projecting upwardly from and at a right-angle to it a guide plate 24 which is guided for desplacement in a guide channel 26 constructed inside the grip housing 29 between an intermediate wall 27 and the housing shell. The upper end of the guide plate 24 is engaged by a spring 25, the other end of which is braced rigid on the housing. The clamping plate 23 can therefore be withdrawn from the grip housing 29 against the force of the spring 25 and hooked under the edge of a table top on which then the grip housing 29 is rigidly clamped under the clamping force of the spring 25. As FIG. 5 shows, there is preferably constructed at the bottom end of the grip housing 29 a trough 28 into which the clamping plate 23 projects so that it can be more easily gripped and withdrawn from the grip housing 29.

In the case of the embodiment shown in FIG. 5, the spring 25 in constructed as a strip-like flat spring having a zig-zag or meandering pattern which is fixed at the upper end of the guide plate 24, its other end being engaged in a fixing projection at the top end of the casing of the housing 29 so that it acts as a draw spring. It is however also possible to construct the spring 25 for example as a flat-pressed coil spring which engages around the guide plate 24 and which is supported between the upper end of the guide plate 24 and the bottom of the grip housing 29, in the fashion of a thrust spring.

To improve the tip-proof of the grip housing 29 on a plate, also another holding device (not shown) can be provided at the lower end of grip housing 29, comprising supporting elements being slidable into the interior of the lower housing end and being, at will, laterally drawn out therefrom to increase the standing surface of the grip housing 29 on the plate. For instance, three or more slots or openings can be formed which are uniformly distributed at the circumference of the lower grip housing end and in each of which a strip-shaped, plate-shaped of rod-shaped supporting element, made of sufficiently bending-rigid material, is guided to be radially drawn out from the housing against friction force. The free ends of the supporting elements, at the latest after being drawn out from the grip housing 29, are in the same plane as the lower side of the housing. This can be performed by providing a downwardly directed extension on the lower side of the free ends of the support elements, the lower side of said extension being in the same plane as the lower side of the housing, or by a little oblique direction of the movement of the supporting elements when being drawn out from the guiding openings thereof, in order that their ends are in the plane of the lower side of the housing when being drawn out and they are placed higher that the bottom of the housing when being introduced therein. Also it is possible, for instance, to use for such a holding device an elastically pretensioned spiral spring which is frictionally guided in an opening at the circumference of the housing 29, have its spiral turns close together when being placed within the housing 29 and spreading open its turns around the lower end of the housing because of said pretensioning when being drawn out from the housing. The pressing spring 39 for batteries 30 can be supported on inner shoulders of the lower end of the housing to be spaced from the bottom thereof to provide for sufficient space for the drawn-in holding device of the kind above within the lower end of the housing in such a way that the supporting elements are placed within the free space under the lower end of the spring when being drawn-in into the housing.

The embodiment of accessory device according to the invention of FIG. 6 is intended for a freely suspended air balloon filled with a light gas and provided with internal illumination. Here, too, the sealing head 2 has a cup-shaped housing 7 consisting of synthetic plastics material and having a closed bottom 7' which, however, in contrast to FIGS. 1 and 2, extends at a right-anle to the axis of the housing. Glued into the top open end of the housing 7 is a cup-shaped reflector 15 having a central aperture 19a in which a capless incandescent light bulb 14a is held to serve as a lamp. Soldered to the filament connecting wires are the two conductors 10, 11 of a cable 6 which is led out in gas-tight fashion through the bottom 7' of the sealing head 2 and which serves at the same time as a supporting means to hold the floating air balloon (not shown in FIG. 6) filled with light gas. At the bottom end of the cable 6, the two conductors 10, 11 are likewise electrically connected to the two terminals of a screw-type incandescent bulb cap 8 and are mechanically fixed therein. Also according to FIG. 6, the cap 8 is extended upwardly by a sleeve-like handle 49 which encloses the cable 6. Therefore, by means of the sleeve-like handle 49, the lamp cap 8 can, as explained in connection with FIG. 4, be screwed into the lamp socket in a grip housing 29 containing batteries. Here, too, the mechanical anchoring of the floating air balloon in the grip housing 29 and the electrical connection of the batteries in the grip housing 29 to the lamp bulb 14a can be guaranteed by the cap 8, switching of the lamp bulb 14y on and off being achieved by a slight twisting of the handle 49, as explained above.

As shown in FIG. 6, the housing 7 of the sealing head 2 and cup-shaped reflector 15 disposed immersed therein consist of the thinnest possible material and also the cable 6 is as thin as possible and light in weight so that the balloon inflated with light gas can be suspended in the air and not fall to the ground under the weight of the sealing head and cable. For the same reason, too, the bulb for internal illumination of the balloon is constructed as a capless bulb 14a so that not only the weight of a lamp cap but also the weight of a lamp socket can be dispensed with in the sealing head 2. The lamp bulb 14a can be cemented, glued or clamped in the central opening of the reflector 15. Likewise for reasons of weight, the housing 7 of the sealing head 2 as shown in FIG. 6 should be as short as possible. Therefore, the filler 16, otherwise than with the embodiments shown in FIGS. 1 and 2, is not located at the bottom end of the cup shell of the housing 7 but on the bottom 7' of the housing. Therefore, the length of the housing 7 does not need to be greater than the length of the neck of the balloon when this is in the elastically widened-out condition of being stretched over the housing 7. Furthermore, the filler 16 according to FIG. 6 has a non-return valve which, in the embodiment shown, consists of a valve flap 18 fixed with one side on the housing bottom 7' and from which, under the pressure of the light gas in the balloon, the upper end of the filler 16 is occluded. In addition, corresponding to FIG. 6, a closure plug 16 may be provided. The gas ports 19 are, according to FIG. 6, constructed as holes in the reflector surface.

FIGS. 7 and 8 show two embodiments of the accessory device according to the invention, which are intended in the main for indoor and outdoor decoration with internally illuminated air balloons and which consist essentially of only the sealing head 2 with a screw-type bulb cap 8 disposed directly thereon. The size of the screw-type bulb cap 8 is adapted to that of the sockets of usual inner and outer lighting luminaires and can be freely chosen. Thus, the screw-type bulb cap 8 of FIG. 7 is a E27-bulb cap and is in case of FIG. 8 a E14-bulb cap. In consequence, the sealing head, together with the air balloon 1 pulled onto it, can be screwed into an outdoor lamp socket which is connected to an external source of current. Preferably, the lamps 14 in the sealing heads are designed to operate on mains current.

Also the sealing heads 2 shown in FIGS. 7 and 8 have a cupshaped housing 7 consisting of a synthetic plastics material and having a bottom 7' on which the bulb cap 8 is fixed in gas-tight fashion. According to FIG. 7, inside the housing 7 there extends downwardly out of the cap 8 a tube 9 in the bottom end of which, close to the open end of the housing 7 which is remote from the cap 8, there is a lamp socket 13 for the lamp 14 which projects upwardly beyond the open end of the housing 7 and which is intended for interior illumination of the air balloon 1, the neck 1a of which is stretched over the housing 7. Also with embodiment shown in FIG. 7, a reflector 15 is disposed in the open ends of the housing 7.

In particular in the case of a lamp 14 which is designed for mains operation, even if it has a low wattage of, for instance, 10 Watts, it will become relatively hot in use so that the air balloon envelope can burst if it comes in contact with the bulb protruding from the housing, due to wind or a draught of air. Therefore, it is preferably for the lamp 14 inserted into the socket 13 to be enclosed by a cap 4 of transparent synthetic plastics material which is placed on the open end of the housing 7, being in particular screwed thereon. The transparent cap 4, of which the outer peripheral surface is circularly cylindrical, its diameter corresponding to the outside diameter of the housing 7, has an outwardly convexly bulbous preferably spherically shell-shaped cap end 12, four air holes 5 being provided close to the rim of the cap and being distributed evenly around its periphery. At the apex of the cap there is an additional hole 5. It is evident that the transparent cap 4 prevents the casing of the air balloon 1 coming in contact with the bulb 14 which is hot when in use. The interior of the cap is ventilated towards the interior of the balloon through the air holes 11 so that no heat can build up in the cap.

Just under the annular bead 1'a of the neck 1a of the air balloon 1 which is stretched over the housing 7 there is also constructed on the housing 7 a filler 16 which can be sealed by a plug 17. Therefore, as with the other embodiments, the air balloon 1 can be inflated through the filler 16, the housing 7, ports 19 in the reflector 15 and the air holes 11 in the transparent cap 4.

In the case of the embodiment shown in FIG. 7, the housing 7 with the transparent cap 4 mounted on it generally has the form of a tubular lamp bulb.

The embodiment shown in FIG. 8 corresponds in its basic design to that shown in FIG. 7 which is indicated by using the same reference numerals to denote the same parts. The housing bottom 7' of the embodiment shown in FIG. 8 is however frustoconical, as with the embodiments shown in FIGS. 1 and 2. Furthermore, according to FIG. 8, there is at the open end of the housing, at the transition to the cap 4 on the housing 7, an outwardly protecting convexly curved annular collar 41, the peripheral surface of which runs smoothly into the outer surface of the cap 4 so that the air balloon 1 with the annular bead 1'a and the balloon neck 1a can, in the manner described in respect of the other embodiments, be pulled onto the sealing head 2 as far as behind the annular collar 41, so that the neck 1a and the annular bead 1'a will rest thereon in sealing-tight fashion. The additional small hole 5 in the apex of the cap 4 also has the purpose of ensuring that when the sealing head 2 is hanging down, any condensate which may form in the cap 4 can flow out.

Furthermore, in the case of the embodiment shown in FIG. 8 there are at the end of the housing which is towards the cap 8, two diametrically oppositely disposed fixing hooks 40 which are open towards that direction of the sealing head 2 which is remote from the lamp 14. Thus, instead of the air balloon 1, it is possible to mount on the sealing head 2 a conventional paper or other type of lantern by engaging its lantern brackets into the fixing hooks 40, so that the sealing head 2 can also be used as an light source for hanging lanterns.

In the case of the embodiments in FIGS. 7 and 8, the reflector 15 may if necessary be dispensed with if the lamp 14 is bright enough to light up the interior of the inflated balloon 1 and is for example constructed as a conventional halogen lamp.

The accessory device according to the invention can also include intermediate adapters which comprise at one end a screw-type bulb cap and at the other end a screw-type lamp socket electrically connected to said bulb cap and adapted such that a closure head 2 according to the invention can be screwed into it with the screw-type bulb-cap 8 of its own. In this way it is possible e.g. for inner decoration of a room having a ceiling in which usual lamp sockets are disposed in an immersed fashion to screw intermediate adapters into the sockets, into which adapters the closure heads 2 are then screwed. Additionally, it is possible in a case that the screw-type bulb cap 8 of a closure head 2 according to the invention would not fit in its seize to an external lamp socket to use such an intermediate adapter, the screw-type bulb cap and the screw-type lamp socket of which are correspondingly different in seize like those of the closure head 2 of FIG. 7. Intermediate adapters of this kind can principially be designed like closure heads 2 according to the invention. However, they must not necessarily comprise a filler 16 or a reflector 15, though, for instance, the closure heads 2 of FIGS. 1, 7 and 8 are also themselves suitable as intermediate adapters.

Further, the construction principle explained in connection with FIG. 4 to construct an electical rotary-type switch by means of the screw-type bulb cap 8 and the screw-type lamp socket 31 can even independantly from inside illuminated air balloons be used for "normal" pocket torches. Namely, if the housing part thereof, including the pocket torch lamp and the reflector, is seperated from its housing part which includes the battery, and if a screw-type lamp socket according to FIG. 4 is provided as an electromagnetical clutch for cooperation with the screw-type bulb cap of the incandescent lamp immediately or indirectly with an additional bulb cap connected to the incandescent lamp, the sliding switch which is the otherwise usual for electric torches and which is relatively expensive, can be dispensed with. Additionally, as explained in connection with FIG. 4, the electrical connection between the screw-type lamp socket 31 and the cup of the battery 30 via the multicore flat cable 32 and the contact-plate 33 can correspondingly be used for "normal" pocket torches too.

The accessory device for gas balloons in accordance with the invention consists as far as possible of a synthetic plastics material which can preferably be worked by the injection moulding process. It is however also possible to construct, for example, the sealing head 2 in FIG. 1 as an integral foam part which has inside it a foam structure coated on the outside by a dense homogeneous skin made from the same foam material. Thus, the cup-shaped housing 7 and possibly also the reflector 15 are formed by the gasproof skin of the integral foam part. It is then possible for the lamp socket and their connecting conductor and also a small tube which has one end terminating at or projecting from the reflector surface while its other end constitutes the filler 16 to be located in the foaming mould whereafter the foaming mould is foamed out, so that the sealing head 2 is manufactured in a single working process.

I claim:

1. An accessory device for an inflatable gas balloon having an elastically-expansible balloon neck integrally formed with an inflatable balloon body, the accessory device comprising:
    a cup-shaped housing having an open end defining a rim, a closed bottom end and a shell extending from the rim of said open end down to the closed bottom end and defining a substantially cylindrical outer surface, the housing being adapted for insertion open end first into said balloon neck after the balloon neck is elastically expanded, such that the entire length of the expanded balloon neck is elastically tensioned in gas tight fashion against said cylindrical outer surface for retaining said balloon without substantial extension of said housing into said balloon body, said housing being made of injection molded plastic material;
    an electric lamp bulb of a cross-sectional size substantially smaller than the inside cross-section of the open end of the housing;
    a reflector inserted into said shell at the open end of the housing, fixed to said shell, and extending within the housing in spaced relation to said closed bottom end to define a chamber in the housing between the reflector and the closed bottom end, said reflector having a concave reflector surface adjacent the open end of the housing and centrally mounting said lamp bulb such that the lamp bulb is radially spaced substantially away from the rim of the shell at the open end of the housing and such that said concave reflector surface radially surrounds the bulb, said reflector occupying substantially completely the inside cross-section of the open end of the housing between said bulb and said shell, said reflector and said lamp bulb being further configured such that the lamp bulb does not extend substantially beyond the open end of the housing, said lamp bulb being connected to electrical conductor wires extending inside the housing from said bulb towards said closed bottom end and being passed through said closed bottom end in a gas tight manner;
    a closable gas feed duct formed adjacent the closed bottom end of the housing and opening into said chamber, and
    an opening means for passing gas from said chamber through said reflector for inflation of the balloon body retained by the housing.

2. The accessory device of claim 1, wherein said lamp bulb is mounted with a screw-type bulb cap screwed into a screw-type lamp socket centrally mounted at the reflector and extending in said chamber in axially spaced relation to the closed bottom end of the housing.

3. The accessory device of claim 1, wherein said closed bottom end of the housing comprises a frusto-conical bottom wall being centrally extended by a short tube into which said conductor wires are sealingly passed.

4. The accessory device of claim 3 wherein a projecting external electromechanical coupling electrically connected to said conductor wires is mounted to said short tube.

5. The accessory device of claim 4, wherein said electromechanical coupling is constructed as a plug-in coupling.

6. The accessory device of claim 5, wherein said electromechanical coupling is constructed as a screw-type bulb cap.

7. The accessory device of claim 2, wherein the reflector is made of an injection molded brilliant super white plastic material.

8. The accessory device of claim 7, wherein said plastic material is a thermoplastic polyester material based on polybutylene terephtalate.

9. The accessory device of claim 2, wherein said reflector is cup-shaped and is snappingly engaged into said open end of the housing.

10. An accessory device for an inflatable gas balloon having an elastically expansible balloon neck integrally formed with an inflatable balloon body, comprising:
    a cup-shaped housing having an open end defining a rim, a closed bottom end and a shell extending from the rim of said open end down to the closed bottom end and defining a substantially cylindrical outer surface, the housing being adapted for insertion with its open end first into said balloon neck after having the balloon neck elastically expanded, such that the entire length of the expanded balloon neck is elastically tensioned in gas tight fashion against said cylindrical outer surface for retaining said balloon without substantial extension into said balloon body, said housing being made of injection-molded molded plastic material;
    an electric lamp bulb of a cross-sectional size substantially smaller than the inside cross-section of the housing, said lamp bulb being mounted with a first screw-type bulb cap;
    a reflector inserted into said shell at said open end of the housing and fixed to said shell to extend within the housing in spaced relation to said closed bottom end to define a chamber in the housing between the reflector and the closed bottom end, said reflector having a concave reflector surface adjacent the open end of the housing and surrounding a screw-type lamp socket receiving said first screw-type bulb cap, such that the lamp bulb is radially spaced substantially away from the rim of the shell at the open end of the housing and said concave reflector surface radially surrounds said bulb, said reflector occupying substatially completely the inside cross-section of the open end of the housing between said lamp socket and said shell, said lamp socket being connected to electrical conductors extending from said lamp socket towards said closed bottom end and being passed through said closed bottom end in a gas tight manner;

a second screw-type bulb cap externally mounted at the closed bottom end of the housing and electrically connected to said electrical conductors;

a transparent cap extending the shell of the housing at the open end thereof and being fitted on the open end of the housing to externally surround said lamp bulb, a closable gas feed duct formed at the shell near the bottom end of the housing, said gas feed duct oepning into said gas space;

a first opening means passing said reflector from said chamber ot the open end of the housing, and a second opening means passing said transparent cap from the open end of the housing to the outside of the transparent cap, whereby gas can be passed through the gas feed duct, the gas space and the first and second opening means for inflation of the balloon body retained by said housing.

11. The accessory device of claim 10, wherein the reflector is made of an injection molded brilliant white thermoplastic polyester material based on polybutylene terephthalate.

12. The accessory device of claim 11, wherein said second opening means is formed by a plurality of openings in said transparent cap evenly distributed around the periphery of the cap.

* * * * *